United States Patent [19]
Wang

[11] Patent Number: 5,596,679
[45] Date of Patent: Jan. 21, 1997

[54] METHOD AND SYSTEM FOR IDENTIFYING SPOKEN SOUNDS IN CONTINUOUS SPEECH BY COMPARING CLASSIFIER OUTPUTS

[75] Inventor: Shay-Ping T. Wang, Long Grove, Ill.

[73] Assignee: Motorola, Inc., Schaumburg, Ill.

[21] Appl. No.: 329,395

[22] Filed: Oct. 26, 1994

[51] Int. Cl.$^6$ ................................................ G10L 5/00
[52] U.S. Cl. ..................... 395/2.45; 395/2.41; 395/2.63
[58] Field of Search ........................ 395/2, 2.12, 2.13, 395/2.26, 2.45, 2.57, 2.62, 2.13, 2.41; 381/41–43

[56] References Cited

U.S. PATENT DOCUMENTS

| | | | |
|---|---|---|---|
| 3,349,183 | 10/1967 | Campanella | 395/2.13 |
| 3,697,703 | 10/1972 | Clark, Jr. et al. | 395/2.12 |
| 3,946,157 | 3/1976 | Dreyfus | 395/2.63 |
| 4,405,838 | 9/1983 | Nitta et al. | 395/2.63 |
| 4,624,008 | 11/1986 | Vensko et al. | 381/43 |
| 4,718,093 | 1/1988 | Brown | 381/43 |
| 4,761,815 | 8/1988 | Hitchcock | 395/2.62 |
| 4,852,172 | 7/1989 | Taguchi | 381/43 |
| 4,852,180 | 7/1989 | Levinson | 381/43 |
| 4,945,566 | 7/1990 | Mergel et al. | 395/2.62 |
| 5,042,001 | 8/1991 | Brightman et al. | 364/736 |
| 5,072,452 | 12/1991 | Brown et al. | 381/43 |
| 5,073,867 | 12/1991 | Murphy et al. | 395/27 |
| 5,239,594 | 8/1993 | Yoda | 382/15 |
| 5,305,422 | 4/1994 | Junqua | 395/2.62 |
| 5,329,608 | 7/1994 | Bocchieri et al. | 395/2.52 |
| 5,365,592 | 11/1994 | Horner et al. | 381/46 |
| 5,369,726 | 11/1994 | Kroeker et al. | 395/2.45 |
| 5,404,422 | 4/1995 | Sakamoto et al. | 395/2.41 |
| 5,450,522 | 9/1995 | Hermansky et al. | 395/2.2 |

OTHER PUBLICATIONS

Jerry M. Rosenberg, Dictionary of Computers, Information Processing, and Telecommunications, 2nd Edition, p. 88.

Fundamentals of Speech Recognition, Lawrence Rabiner et al., Published by Prentice Hall, Inc., 1993, pp. 122–132.

Speech Recognition by Computer, Stephen E. Levinson et al., Scientific American, Apr. 1981, pp. 64–76.

On the Use of Bandpass Liftering in Speech Recognition, Biing–Hwang Juang et al., IEEE Transactions on Acoustics, Speech, and Signal Processing, vol. ASSP–35, No. 7, Jul. 1987.

Highly–automated, Non–parametric statistical learning for autonomous target recognition, Keith C. Drake, AbTech Corporation, 700 Harris Street, Charlottesville, Virginia 22903, pp. 1–10, Proceedings of the SPI 20th Applied Imagery Pattern Recognition Workshop, Oct. 1991, McLean, Virginia.

On the Design Principles of the Functional Link Nets, Jun Wang and Edilberto P. Teixeira, Department of Systems Engineering, Case Western Reserve University, Cleveland, Ohio 44106, pp. 613–616, Ieee International Conf. on Systems Engineering, Aug. 9–11, 1990, Vista International Hotel, Pittsburgh, Pennsylvania, IEEE Catalog No:90CH2872–0.

A Neural Feed–Forward Network with a Polynomial Non-linearity, Nils Hoffmann, Electronics Institute, Building 349, Technical University of Denmark, DK–2800 Lyngby, Denmark, Neural Networks for Signal Processing, Proceedings of the IEEE–SP Workshop, Aug. 31–Sep. 2, 199?, pp. 49–58.

(List continued on next page.)

*Primary Examiner*—David D. Knepper
*Attorney, Agent, or Firm*—Michael K. Lindsey; Bruce E. Stuckman

[57] ABSTRACT

In a speech-recognition system having a plurality of classifiers, a voting window includes a sequence of outputs from each of the classifiers. At each interval in the voting window, the outputs are compared to determine a winning output. A spoken sound is identified by determining which classifier generates the greatest number of winning outputs in the voting window.

22 Claims, 8 Drawing Sheets

OTHER PUBLICATIONS

A Polynomial time Algorithm for Generating Neural Networkes for Classification Problems, Asim Roy and Somnath Mukhopadhyay, Dept. of Decision and Information Systems, Arizona State University, IJCNN, 1992, 0-7803-0559-0/92 IEEE, pp. I-147-I-152.

Modeling systems with Polynomial Networks, Tools for Predicting Behavior, Peter D. Varhol, Programmer's Workbench, Dr. Dobb's Journal, Sep. 1993, Begins on p. 76.

Polynomial Functions Can Be Realized by Finite Size Multilayer Feedforward Neural Networks, Naohiro Toda, Ken-ichi Funahashi and Shiro USUI, Department of Information and Computer Sciences, Toyohashi University of Technology, Tempaku, Toyohashi 441, Japan, 1991 IEEE International Joint Conference on Neural Networks, vol. 1 of 3, The Westin Stamford and Westin Plaza, 18-21, Nov. 1991, Singapore.

An Artificial Neural Networks for Approximating Polynomial Functions, Behnam Malakooti and YingQing Zhou, Department of Ssytems Engineering, Center for Automation and Intelligent Systmes Research, Case Western Reserve University, Cleveland, Ohio, International Joint Conference on Neural Networks, Jun. 1992, pp. III-966-III-971.

Robot Kinematics Learning Computations Using Polynomial Neural Networks, C. L. Philip Chen and A. D. McAulay, Department of Computer Science and Engineering, Wright State University, Dayton, OH 45435, Proceedings of the 1991 IEEE, International Cof. on Robotics and Automation, Sacramento, CA, Apr. 1991, pp. 2638-2643.

Poloynomial and Standard Higher Order Neural Network, Chir-Ho Cbang et al., 1993 International Conference on Neural Networks, Mar. 28-Apr. 1, 1993, pp. 989-994.

Speech Coding and Recognition: A Review, Andreas S. Spanias et al., IEICE Trans. Fundamentals, vol. E75-A, No. 2, Feb. 1992.

A Tutorial on Hidden Markov Models and Selected Applications in Speech Recognition, Lawrence R. Rabiner, Proceedings of the IEEE, vol. 77, No. 2, Feb. 1992.

|     | C1  | C2  | C3   | C4   | C5  | C6  |
|-----|-----|-----|------|------|-----|-----|
| $t_1$ | 0.1 | 2.0 | 15.0 | 17.5 | 3.4 | 9.3 |
| $t_2$ | 3.2 | 1.8 | 18.3 | 2.6  | 4.6 | 6.7 |
| $t_3$ | 0.7 | 8.1 | 20.1 | 5.9  | 6.8 | 2.0 |

170

|     | C1 | C2 | C3 | C4 | C5 | C6 |
|-----|----|----|----|----|----|----|
| $t_1$ | 0  | 0  | 0  | 1  | 0  | 0  |
| $t_2$ | 0  | 0  | 1  | 0  | 0  | 0  |
| $t_3$ | 0  | 0  | 1  | 0  | 0  | 0  |

172

|     | C1 | C2 | C3 | C4 | C5 | C6 |
|-----|----|----|----|----|----|----|
| $t_1$ | 0  | 0  | 1  | 1  | 0  | 0  |
| $t_2$ | 0  | 0  | 1  | 0  | 0  | 1  |
| $t_3$ | 0  | 1  | 1  | 0  | 0  | 0  |

METHOD AND SYSTEM FOR IDENTIFYING SPOKEN SOUNDS IN CONTINUOUS SPEECH BY COMPARING CLASSIFIER OUTPUTS

TECHNICAL FIELD

This invention relates generally to speech-recognition systems and, in particular, to a method for identifying continuous speech.

BACKGROUND OF THE INVENTION

For many years, scientists have been trying to find a means to simplify the interface between man and machine. Input devices such as the keyboard, mouse, touch screen, and pen are currently the most commonly used tools for implementing a man/machine interface. However, a simpler and more natural interface between man and machine may be human speech. A device which automatically recognizes speech would provide such an interface.

Applications for an automated speech-recognition device include a database query technique using voice commands, voice input for quality control in a manufacturing process, a voice-dial cellular phone which would allow a driver to focus on the road while dialing, and a voice-operated prosthetic device for the physically disabled.

Unfortunately, automated speech recognition is not a trivial task. One reason is that speech tends to vary considerably from one person to another. For instance, the same word uttered by several persons may sound significantly different due to differences in accent, speaking speed, gender, or age. In addition to speaker variability, co-articulation effects, speaking modes (shout/whisper), and background noise present enormous problems to speech-recognition devices.

Since the late 1960's, various methodologies have been introduced for automated speech recognition. While some methods are based on extended knowledge with corresponding heuristic strategies, others rely on speech databases and learning methodologies. The latter methods include dynamic time-warping (DTW) and hidden-Markov modeling (HMM). Both of these methods, as well as the use of time-delay neural networks (TDNN), are discussed below.

Dynamic time-warping is a technique which uses an optimization principle to minimize the errors between an unknown spoken word and a stored template of a known word. Reported data shows that the DTW technique is very robust and produces good recognition. However, the DTW technique is computationally intensive. Therefore, it is currently impractical to implement the DTW technique for real-world applications.

Instead of directly comparing an unknown spoken word to a template of a known word, the hidden-Markov modeling technique uses stochastic models for known words and compares the probability that the unknown word was generated by each model. When an unknown word is uttered, the HMM technique will check the sequence (or state) of the word, and find the model that provides the best match. The HMM technique has been successfully used in many commercial applications; however, the technique has many drawbacks. These drawbacks include an inability to differentiate acoustically similar words, a susceptibility to noise, and computational intensiveness.

Recently, neural networks have been used for problems that are highly unstructured and otherwise intractable, such as speech recognition. A time-delay neural network is a type of neural network which addresses the temporal effects of speech by adopting limited neuron connections. For limited word recognition, a TDNN shows slightly better results than the HMM method. However, a TDNN suffers from two serious drawbacks.

First, the training time for a TDNN is very lengthy, on the order of several weeks. Second, the training algorithm for a TDNN often converges to a local minimum, which is not the globally optimum solution.

In summary, the drawbacks of existing known methods of automated speech-recognition (e.g. algorithms requiring impractical amounts of computation, limited tolerance to speaker variability and background noise, excessive training time, etc.) severely limit the acceptance and proliferation of speech-recognition devices in many potential areas of utility. There is thus a significant need for an automated speech-recognition system which provides a high level of accuracy, is immune to background noise, and is insensitive to differences in speakers.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF A PREFERRED EMBODIMENT

Figure 1:
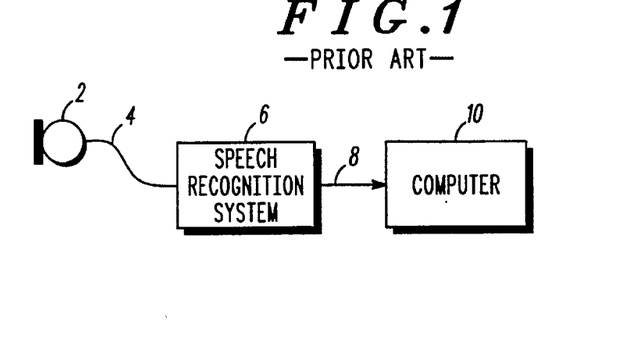
FIG. 1 illustrates a contextual diagram of a prior art speech recognition system.

FIG. 1 shows a contextual block diagram of a prior art speech-recognition system. The diagram shows microphone 2 or other means for receiving audio input in the form of speech input and converting sound into electrical energy. Speech-recognition system 6 receives signals from microphone 2 over transmission medium 4 and performs various tasks such as waveform sampling, analog-to-digital (A/D) conversion, feature extraction and classification. Speech-recognition system 6 provides the identity of spoken sounds to computer 10 via bus 8. Computer 10 executes commands or programs which may utilize the data provided by speech-recognition system 6.

One of ordinary skill will understand that speech-recognition system 6 may transmit spoken sound identities to devices other than a computer. For example, a communication network, data storage system, or transcription device could be substituted for computer 10.

The system depicted by FIG. 1 is used for recognizing spoken sound from continuously spoken speech. Continuously spoken speech, or continuous speech, takes place when a person speaking into the microphone does not un-naturally pause between each spoken sound. Rather, the person speaking only pauses when the natural form of speech dictates a pause, such as at the end of a sentence. For this reason, continuous speech can be thought of as "natural" speech which occurs in an ordinary conversation. Continuously spoken speech includes at least one spoken sound, wherein a spoken sound may be a word, syllable, or phoneme. A phoneme is the smallest element of speech sound which indicates a difference in meaning. A syllable includes one or more phonemes, and a word includes one or more syllables.

Figure 2:
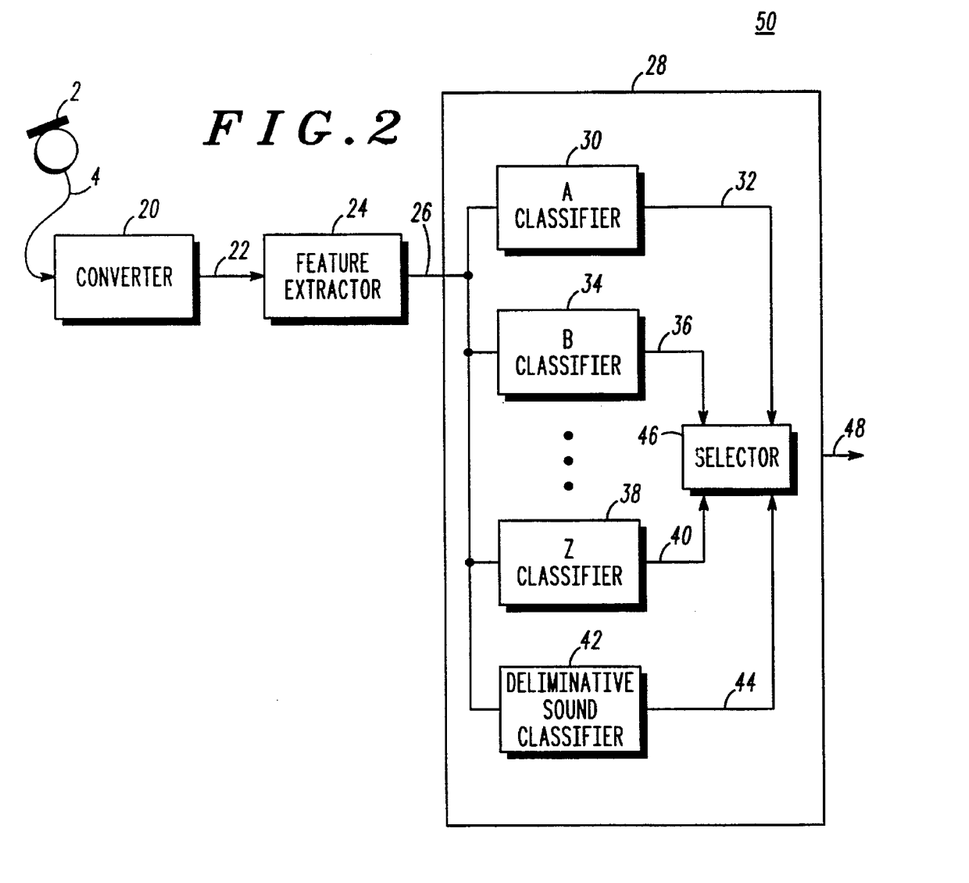
FIG. 2 illustrates a block diagram of a speech-recognition system which incorporates an embodiment of the present invention.

FIG. 2 illustrates a block diagram of a speech-recognition system 50 which incorporates an embodiment of the present invention. The speech-recognition system comprises microphone 2, converter 20, feature extractor 24, and recognition means 28. Recognition means 28, in turn, includes a plurality of classifiers and selector 46. Of the plurality of classifiers, sound classifiers 30, 34, and 38 are shown. In addition to sound classifiers, delimitative sound classifier 42 is also shown. The details of delimitative sound classifier 42 are provided by Related Invention No. 4 identified above.

Figure 3:
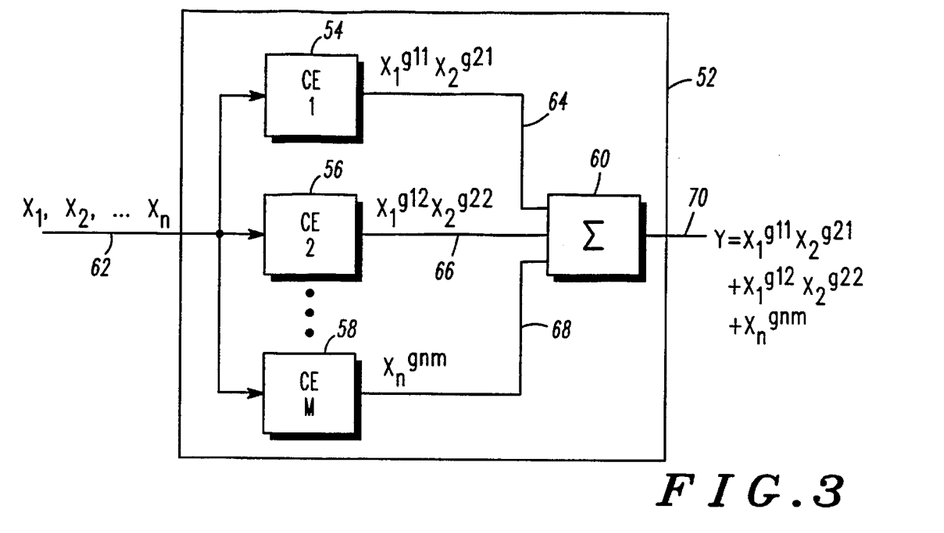
FIG. 3 shows a flow diagram of a method of identifying a spoken sound from continuously spoken speech in accordance with a preferred embodiment of the present invention.

A preferred embodiment of the present invention, shown in FIG. 3, resides in selector 46. The embodiment of the present invention shown in FIG. 7 resides in speech-recognition system 50.

In one embodiment of the present invention, speech-recognition system 50 is implemented by software running on a computer processor such as a microprocessor. However, one of ordinary skill will recognize that a programmable logic array, application specific integrated circuit (ASIC), or other digital logic device could also be used to implement any of the functions performed by speech-recognition system 50.

Continuous speech is received by microphone 2 and converted to signals which are transmitted across transmission medium 4 to converter 20. Upon receiving a speech sample, converter 20 performs various functions which utilize the speech sample. These functions include waveform sampling, filtering, and analog-to-digital (A/D) conversion. Converter 20 generates as output a speech signal which is passed to feature extractor 24 via bus 22. Feature extractor 24 produces a plurality of features from the speech signal. These features are passed to the plurality of classifiers over bus 26. In response to the features, each classifier generates a sequence of outputs. The classifier outputs are then passed to selector 46 over buses 32, 36, 40, and 44. In turn, selector 46 generates a system output on bus 48.

An example of the operation of the system presented by FIG. 2 is as follows. When a user utters continuous speech, microphone 2 generates a signal which represents the acoustic waveform of the speech. Typically, the signal from microphone 2 is an analog signal. This signal is then fed to converter 20 for digitization. Converter 20 includes appropriate means for A/D conversion. An A/D converter may sample the signal from microphone 2 several thousand times per second (e.g. between 8000 and 14,000 times per second, depending on the frequency components of the speech signal from the microphone). Each of the samples is then converted to a digital word, wherein the length of the word is between 12 and 32 bits.

Those of ordinary skill in the art will understand that the sampling rate and word length of A/D converters may vary and that the numbers given above do not place any limitations on the sampling rate or word length of an A/D converter used in conjunction with an embodiment of the present invention.

The speech signal comprises one or more of these digital words, wherein each digital word represents a sample of the continuous speech taken at an instant in time. The speech signal is passed to feature extractor 24 where the digital words, over an interval of time, are grouped into a data frame. In accordance with a preferred embodiment of the present invention, each data frame represents 10 milliseconds of speech signal. However, one of ordinary skill in the art will recognize that other data frame durations may be used, depending on a number of factors such as the duration of the spoken sounds to be identified. The data frames are in turn subjected to cepstral analysis, a method of feature extraction, which is performed by feature extractor 24.

The cepstral analysis, a method of feature extraction, which is performed on the speech signal, results in a representation of the speech signal which characterizes the relevant features of the continuous speech over the interval of time. It can be regarded as a data reduction procedure that retains vital characteristics of the speech signal and eliminates undesirable interference from irrelevant characteristics of the speech signal, thus easing the decision-making process for the plurality of classifiers.

The cepstral analysis is performed as follows. First, a p-th order (typically p=12 to 14) linear prediction analysis is applied to a set of digital words from the speech signal to yield p prediction coefficients. The prediction coefficients are then converted into cepstrum coefficients using the following recursion formula:

$$c(n) = a(n) + \sum_{k=1}^{n-1} (1 - k/n)a(k)c(n-k) \qquad \text{Equation (2)}$$

wherein $c(n)$ represents the $n^{th}$ cepstrum coefficient, $a(n)$ represents the $n^{th}$ prediction coefficient, $1 \leq n \leq p$, p is equal to the number of cepstrum coefficients, n represents an integer index, and k represents an integer index, and $a(k)$ represents the $k^{th}$ prediction coefficient and $c(n-k)$ represents the $(n-k)^{th}$ cepstrum coefficient.

The vector of cepstrum coefficients is usually weighted by a sine window of the form, $$\alpha(n) = 1 + (L/2)\sin(\pi n/L) \qquad \text{Equation (3)}$$

wherein $1 \leq n \leq p$, and L is an integer constant, giving the weighted cepstrum vector, $C(n)$, wherein $$C(n) = c(n)\alpha(n) \qquad \text{Equation (4)}$$

This weighting is commonly referred to as cepstrum liftering. The effect of this liftering process is to smooth the spectral peaks in the spectrum of the speech signal. It has also been found that cepstrum liftering suppresses the existing variations in the high and low cepstrum coefficients, and thus considerably improves the performance of the speech-recognition system.

The result of the cepstral analysis is a smoothed log spectra which corresponds to the frequency components of the speech signal over an interval of time. The significant features of the speech signal are thus preserved in the spectra. Feature extractor 24 generates a respective feature frame which comprises data points from the spectrum generated from a corresponding data frame. The feature frame is then passed to the plurality of classifiers.

In accordance with an embodiment of the present invention, a feature frame contains twelve data points, wherein each of the data points represents the value of cepstrally-smoothed spectrum at a specific frequency over the interval of time. The data points are 32-bit digital words. Those skilled in the art will understand that the present invention places no limits on the number of data points per feature frame or the bit length of the data points; the number of data points contained in a feature frame may be twelve or any other appropriate value, while the data point bit length may be 32 bits, 16 bits, or any other value.

Referring now to the classifiers of recognition means 28, a parametric decision method is used by each of the classifiers to determine whether a set of features belongs to a certain class. A class may represent spoken sound. Using a parametric decision method, a classifier implements a discriminant function y(X), where $X=\{x_1, x_2, \ldots, x_n\}$ is the set of features and n is an integer index. The set of features may include cepstrum, linear predictive, or Fourier coefficients. Upon receiving a set of features, a classifier computes its respective discriminant function and produces a result. Generally, the magnitude of the result indicates whether a set of features belongs to the class which corresponds to the discriminant function. In accordance with a preferred embodiment of the present invention, the magnitude of the result is directly proportional to the likelihood that the set of features belongs to the corresponding class.

The discriminant function implemented by each of the classifiers is based upon the use of a polynomial expansion and, in a loose sense, the use of an orthogonal function, such as a sine, cosine, exponential/logarithmic, Fourier transformation, Legendre polynomial, non-linear basis function such as a Volterra function or a radial basis function, or the like, or a combination of polynomial expansion and orthogonal functions.

The general case of the polynomial expansion is represented by Equation 1 as follows:

$$y = \sum_{i=1}^{m} w_{i-1} x_1^{g_{1i}} x_2^{g_{2i}} \ldots x_n^{g_{ni}} \qquad \text{Equation (1)}$$

where $x_i$ represent the classifier inputs and can be a function such as $x_i=f_i(z_j)$, wherein $z_j$ is any arbitrary variable, and where the indices i, j, and m may be any integers; where y represents the output of the classifier; where $w_{i-1}$ represents the coefficient for the ith term; where $g_{1i}, \ldots, g_{ni}$ represent the exponents for the ith term and are integers; and n is the number of classifier inputs.

As disclosed by above-identified Related Invention No. 3, a learning machine may be trained to behave as a classifier by tuning the coefficients of a discriminant function which is based on a polynomial expansion of the form given by Equation 1. Related Invention No. 3 describes a training algorithm which determines the coefficient, $w_{i-1}$, of each term in the polynomial expansion.

In FIG. 2, each classifier implements a different discriminate function. In the example shown, classifier 30 implements a discriminate function for the spoken sound which represents the sound of the character "A"; while classifier 34 implements a discriminate function for the spoken sound which represents the sound of the character "B"; and classifier 38 implements a discriminate function for the spoken sound which represents the sound of the character "Z", Delimitative sound classifier 42 implements a discriminate function for a delimitative sound. The discriminate functions implemented by each of the Classifiers in recognition means 28 is a polynomial expansion of the form given by Equation 1.

In the example, the result of the discriminate function implemented by classifier 30 is passed to selector 46 across bus 32; the result of the discriminate function implemented by classifier 34 is passed across bus 36 to selector 46; and the result of the discriminate function implemented by classifier 38 is passed across bus 40 to selector 46. In addition, the result of the discriminate function implemented by delimitative sound classifier 42 is passed across bus 44 to selector 46.

Selector 46 generates at least one system output, based on the classifier outputs, which represents the identity of the spoken sound. The system output includes a class label which is associated with one of the classifiers. The class label may be a binary code which represents the spoken sound in ASCII. In a preferred embodiment of the present invention, selector 46 generates system outputs by implementing the method shown in FIG. 3.

Figure 9:
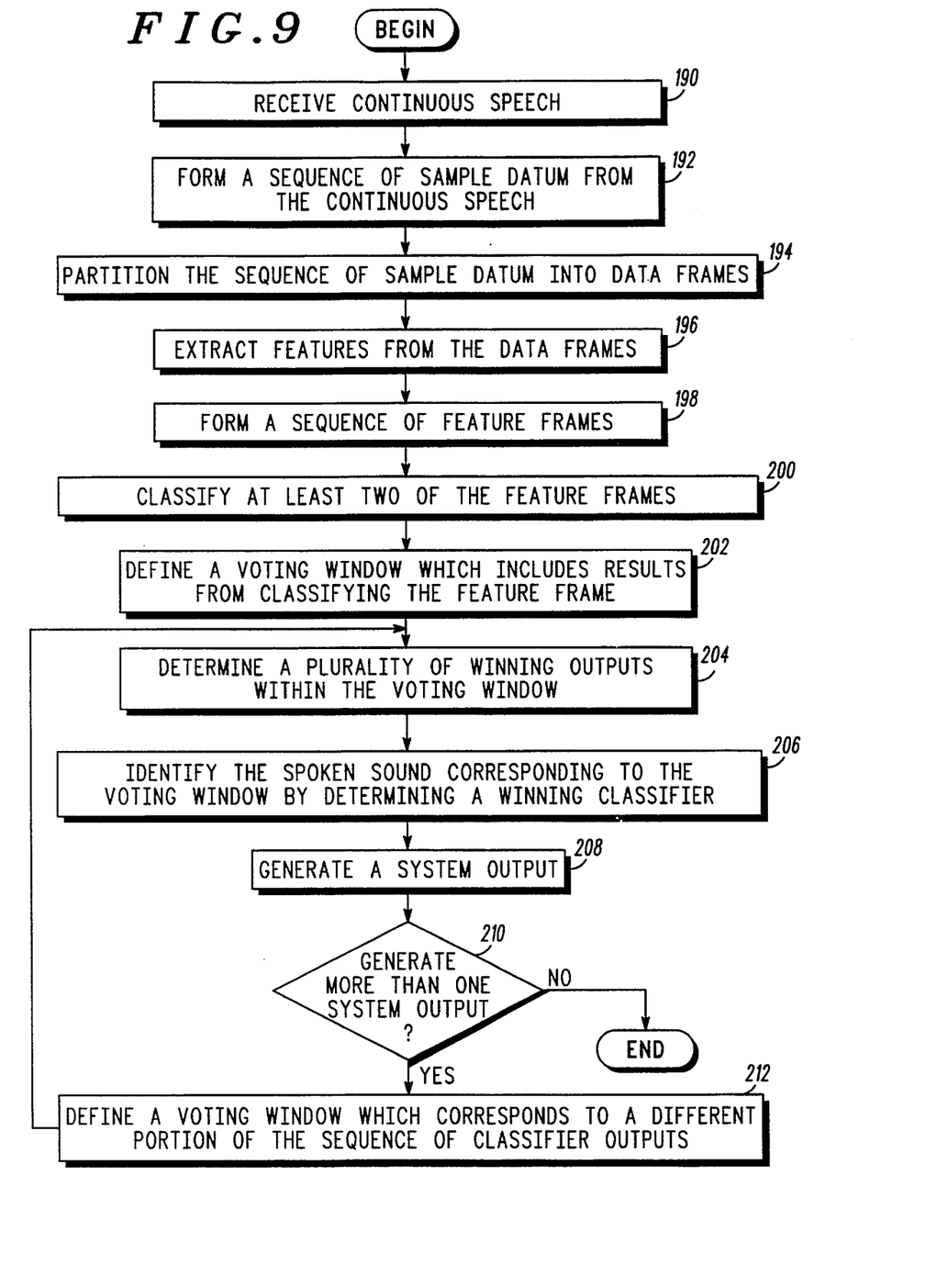
FIG. 9 is a block diagram of a classifier that can generate classifier output signals utilized by an embodiment of the present invention.

FIG. 9 is a block diagram of a classifier that can generate classifier output signals utilized by an embodiment of the present invention. Classifier 52 is a possible implementation of one of the plurality of classifiers depicted in FIG. 2. Classifier 52 includes a plurality of computing elements, of which computing element 54, 56, and 58 are shown. Classifier 52 also includes summation circuit 60.

A polynomial expansion is calculated by classifier 52 in the following manner. A plurality of data inputs $x_1, x_2, \ldots, x_n$ are fed into classifier 52 using bus 62 and then distributed to the plurality of computing elements, represented by 54, 56, and 58. Typically, the data inputs would be data points from a feature frame. After computing a term, a computing element passes the term to summing circuit 60 which sums the terms computed by the computing elements and places the sum on output 70.

For example, FIG. 9 depicts the computation of the polynomial $y = x_1^{g_{11}} x_2^{g_{21}} + x_1^{g_{12}} x_2^{g_{22}} + \ldots x_n^{g_{nm}}$. Computing element 54 computes the term $x_1^{g_{11}} x_2^{g_{21}}$ and then sends it to summing circuit 60 over bust 64; computing element 56 computes the term $x_1^{g_{12}} x_2^{g_{22}}$ and then sends it to summing circuit 60 over bus 66; and computing element 58 computes the term $x_n^{g_{nm}}$ and then sends it to summing circuit 60 over bus 68. Upon receiving the terms from the computing elements, summing circuit 60 sums the terms and places the result of the polynomial expansion, y, on output 70.

It will be apparent to one of ordinary skid that classifier 52 is capable of computing polynomials of the form given by Equation 1 which have a number of terms different from the above example, and polynomials whose terms are composed of data inputs different from those of the above example.

In one embodiment of the present invention, classifier 52 is implemented by software running on a processor such as a microprocessor. However, one of ordinary skill in the art will recognize that a programmable logic array, ASIC or other digital logic device could also be used to implement the functions performed by the classifier 52.

Figure 10:
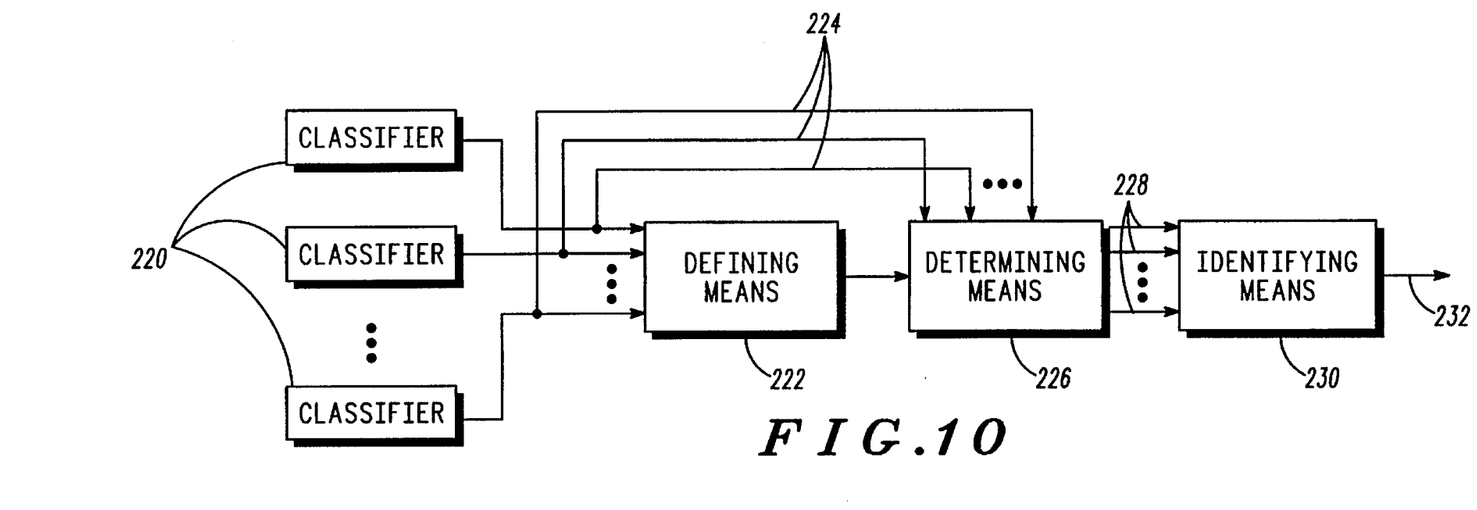
FIG. 10 shows a flow diagram of a method of training the classifier of FIG. 9.

FIG. 10 shows a flow diagram of a method of training the classifier of FIG. 9. A speech-recognition system constructed in accordance with an embodiment of present invention has principally two modes of operation: (1) a training mode in which examples of spoken sounds are used to train the plurality of classifiers, and (2) a recognition mode in which spoken sounds in continuous speech are identified. Referring to FIG. 2, generally, a user must train the plurality of classifiers by providing examples of all of the spoken sounds that the system is to recognize.

In an embodiment of the present invention, a classifier may be trained by tuning the coefficients of a discriminant function which is based on a polynomial expansion of the form given by Equation 1. For the discriminant function to effectively classify input data, the coefficient, $w_{i-1}$, of each term in the polynomial expansion must be determined. This can be accomplished by the use of the following training method.

In box 72, a plurality of spoken sound examples is provided. A spoken sound example comprises two components. The first component is a set of classifier inputs derived from the spoken sound, and the second component is a corresponding desired classifier output signal.

Next, in box 74, the trainer compares the number of spoken sound examples with the number of polynomial coefficients in the discriminate function.

In decision box 76, a check is made to determine whether the number of polynomial terms is equal to the number of spoken sound examples. If so, the spoke sound examples can be represented as a square-matrix and the method proceeds to box 78. If not, the method proceeds to box 80.

In box 78, a matrix inversion technique is used to solve for the value of each polynomial coefficient. Using matrix inversion, the discriminant transfer function can be represented by the matrix equation Y=WZ, where Y represents a matrix of example classifier output signals, W represent a matrix of coefficients, and Z is a matrix of signals representing functions of the example classifier inputs, such as exponential functions. The coefficient matrix is determined according to the equation $W=Z^{-1}Y$, where $Z^{-1}$ represents the inverse matrix of Z.

In box 80, a least squares estimation technique is used to solve for the value of each polynomial coefficient. Essentially, a polynomial discriminant function is fitted to the set of spoken sound examples using a suitable least-squares estimation technique such as: least-squares, extended least-squares, pseudo-inverse, Kalman filter, maximum-likelihood algorithm, Bayesian estimation, and the like.

In implementing a classifier which is usable in an embodiment of the present invention, one generally selects the number of computing elements in the classifier to be equal to or less than the number of examples presented to the classifier.

FIG. 3 shows a flow diagram of a method of identifying a spoken sound from continuously spoken speech in accordance with a preferred embodiment of the present invention. In box 90, outputs from a plurality of classifiers are received. Each classifier generates a sequence of outputs which results from computing a discriminant function based on a polynomial expansion of the form given by Equation 1. The operations of the classifiers are synchronized such that outputs are received corresponding to specific intervals of time.

In box 92, a voting window is defined. A voting window encompasses a subsequence of outputs from each of the classifiers; furthermore, a voting window corresponds to a predetermined windowing interval (comprising a plurality of the time intervals used for feature extraction) and includes only those outputs generated during the predetermined windowing interval. Next, in box 94, a plurality of winning outputs is determined within the predetermined windowing interval of the voting window. A winning output is simply a classifier output having the greatest magnitude at a corresponding specific feature interval.

In box 96, the spoken sound is identified by determining a winning classifier within the voting window. The winning classifier produces the most winning outputs during the predetermined interval of the voting window. Essentially, a winning classifier identifies the spoken sound since each classifier has an associated class label which represents a spoken sound.

In box 98, a system output is generated which includes the class label of the winning classifier.

In decision box 100, a check is made to determine whether another system output should be generated. If so, the method proceeds to box 102. If not, the method terminates.

In box 102, another voting window is defined which includes a different subset of classifier outputs and corresponds to a different predetermined interval of time. Upon exiting box 102, the method returns to box 94.

Figure 4:
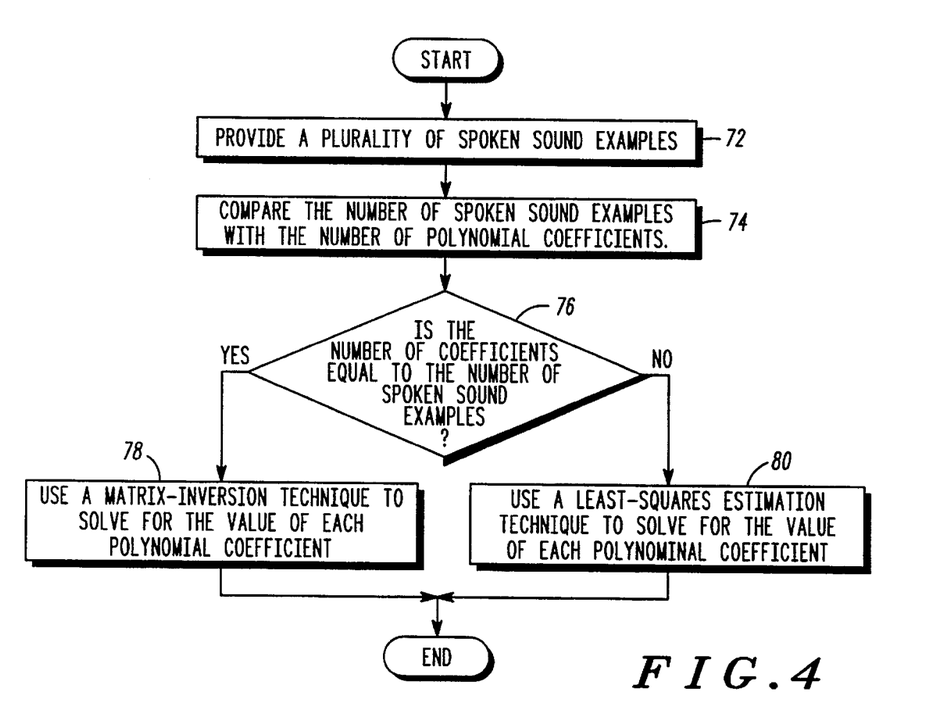
FIG. 4 illustrates an example of a voting window superimposed on graphs of classifier outputs.

FIG. 4 illustrates the concept of a voting window. Graph 110 depicts the outputs of a first classifier; graph 112 depicts the outputs of a second classifier; and graph 114 depicts the outputs of a third classifier. Axis 116 indicates time and axis 118 indicates the magnitude of the classifier outputs. The voting window is defined by a starting time, which is depicted by dotted line 120; an ending time, which is depicted by dotted line 122; and a predetermined windowing interval, or duration, which is depicted by arrow 124. In the example shown, the voting window includes outputs of the first, second, and third classifiers which occur at specific feature intervals $t_5$-$t_{10}$.

Although FIG. 4 shows a voting window which includes a sequence of three outputs from six different classifiers, it will be apparent to one of ordinary skill in the art that a voting window may include a sequence having more or less than three outputs from any number of classifiers.

Figure 5:
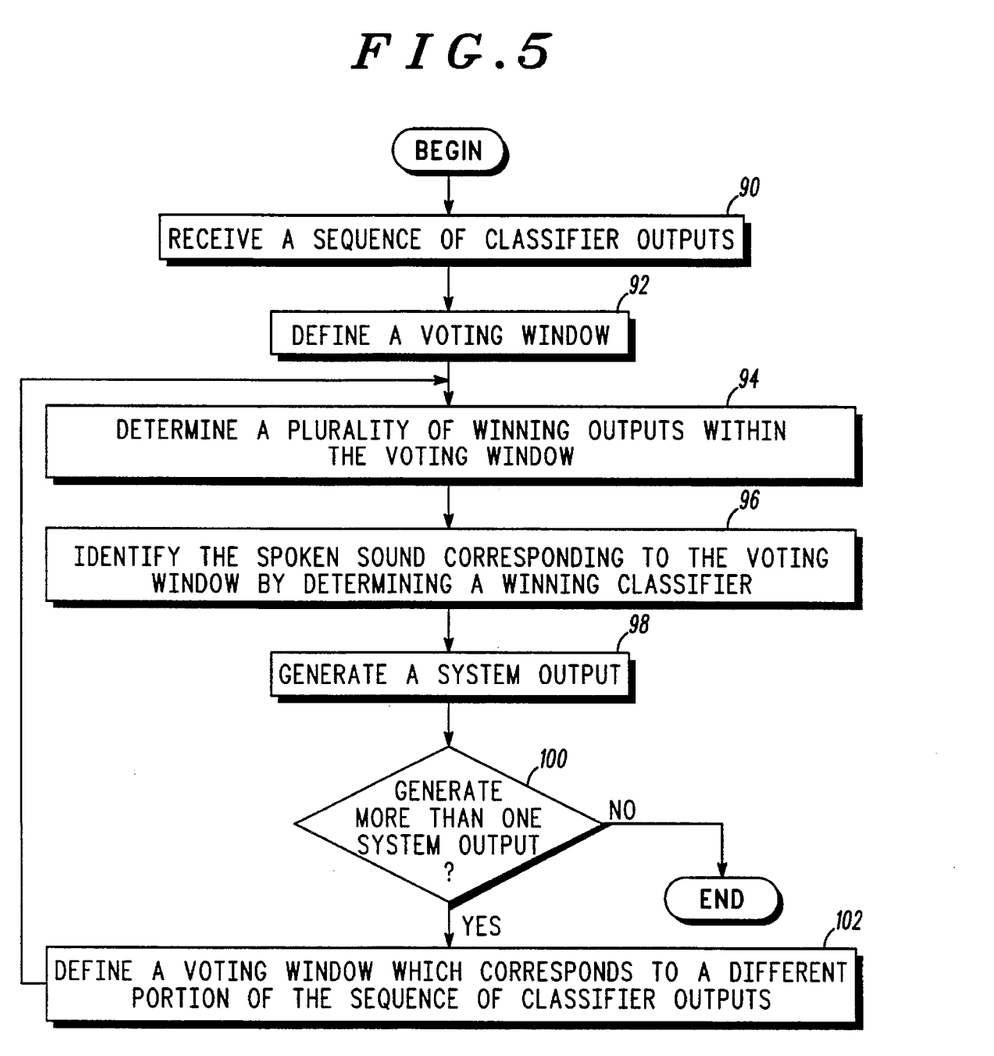
FIG. 5 illustrates an example of two voting windows superimposed on graphs of classifier outputs.

FIG. 5 conceptually illustrates an example of two voting windows. A first voting window is defined by a first starting time, which is depicted by dotted line 120; a first ending time, which is depicted by dotted line 122; and a first predetermined windowing interval, which is depicted by arrow 124. In the example shown, the first voting window includes outputs of the first, second, and third classifiers which occur at specific time intervals $t_5$-$t_{10}$ and is used to determine a first system output. A second voting window is defined by a second starting time, which is depicted by dotted line 126; a second ending time, which is depicted by dotted line 128; and a second predetermined windowing interval, which is depicted by arrow 130. In the example shown, the second voting window includes outputs of the first, second, and third classifiers which occur at specific time intervals $t_9$-$t_{14}$ and is used to generate a second system output corresponding to a later portion of the continuous speech than the first system output.

Although FIG. 5 shows an example of voting windows which overlap in time, it will be apparent to one of ordinary skill in the art that voting windows need not overlap, and in fact, they may be separated by an intervening period of time. Furthermore, one of ordinary skill will realize that the predetermined interval of time may vary between different voting windows.

Figure 6:
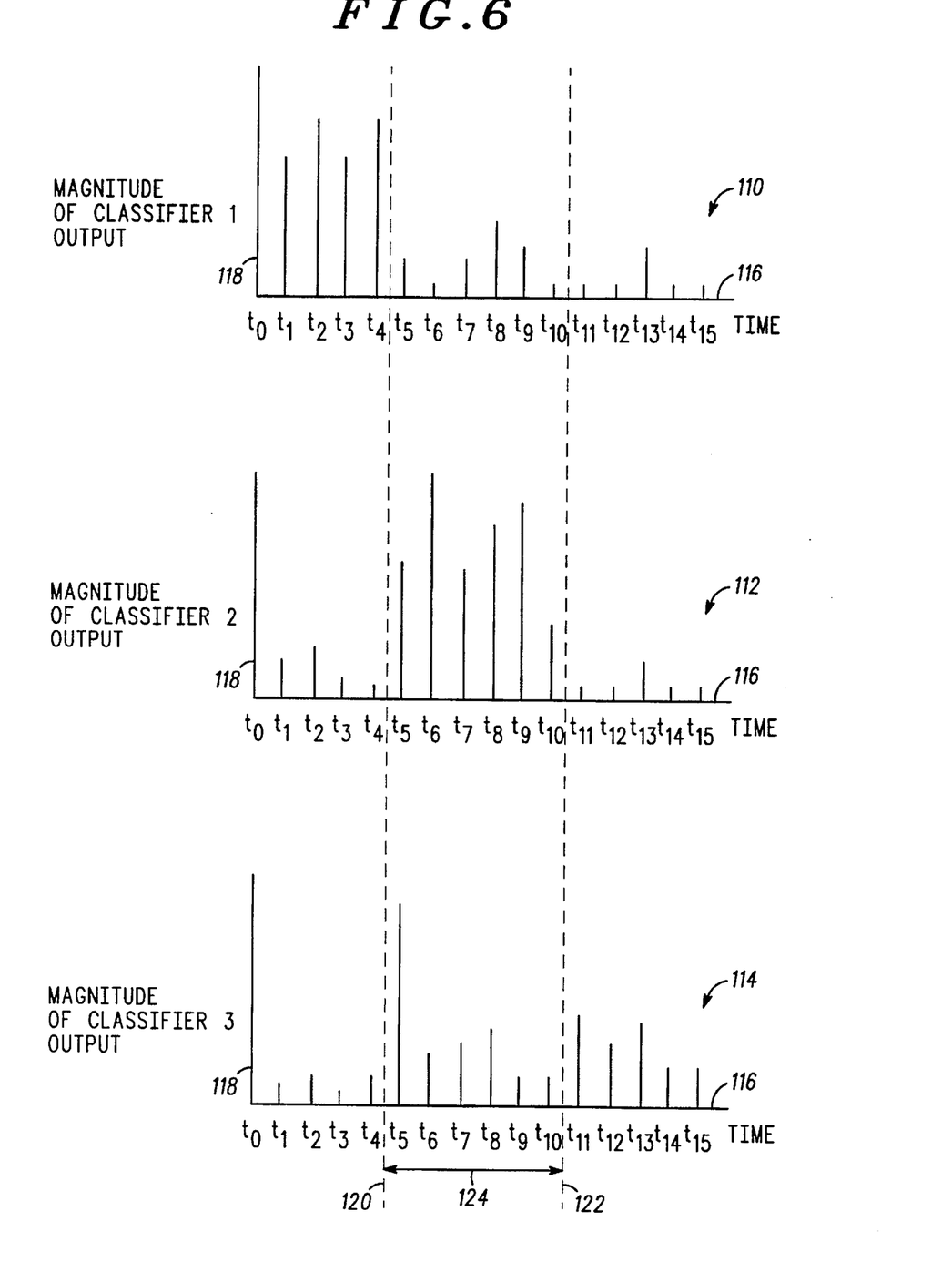
FIG. 6 further illustrates examples of voting windows.

FIG. 6 further illustrates examples of voting windows. Voting window 170 includes fifteen values which represent the magnitudes of classifier outputs. The columns of values correspond to classifiers. For example, the values in the left-most column are outputs generated by classifier C1, the values in the next column are outputs generated by classifier C2, and so forth. The rows of values correspond to intervals of time within voting window 170.

Although voting window 170 shows magnitudes which are real numbers ranging between 0 and 20, one of ordinary skill in the art will appreciate that a magnitude may be any number type within any range.

Voting window 172 shows an example of how the winning outputs of voting window 170 are identified. In voting window 172, a winning output is given by a one. At each interval of time, the winning output is the classifier output with the greatest magnitude. Losing outputs are given by a zero. Thus, at interval $t_1$, classifier C4 generates the winning output; at intervals $t_2$ and $t_3$, classifier C3 generates the winning outputs. The winning classifier corresponding to voting window 172 is C3, since it generated the greatest number of winning outputs within voting window 172.

Voting window 174 shows an example of identifying more than one winning output at each interval within voting window 170. Similar to voting window 172, winning outputs are identified by a one and losing outputs are identified by a zero. However, at each interval, two winning outputs are determined. The two winning outputs correspond to the classifier outputs having the greatest and second greatest magnitudes. In the example shown, the winning classifier corresponding to voting window 174 is classifier C3.

The reason for representing a classifier output as non-parametric values, i.e., either one or zero, for example, as depicted by voting windows 172 and 174, is to prevent a "shouting classifier" from skewing the determination of a winning classifier. A shouting classifier is a classifier which, for one reason or another, generates a disproportionately large output relative to the other classifiers. Thus, if the magnitudes of the classifier outputs are not converted to non-parametric values, one and zero as an example, a classifier which shouts at only one time interval within the voting window could be erroneously identified as the winning classifier. This could negatively affect the overall performance of the speech-recognition system.

Figure 7:
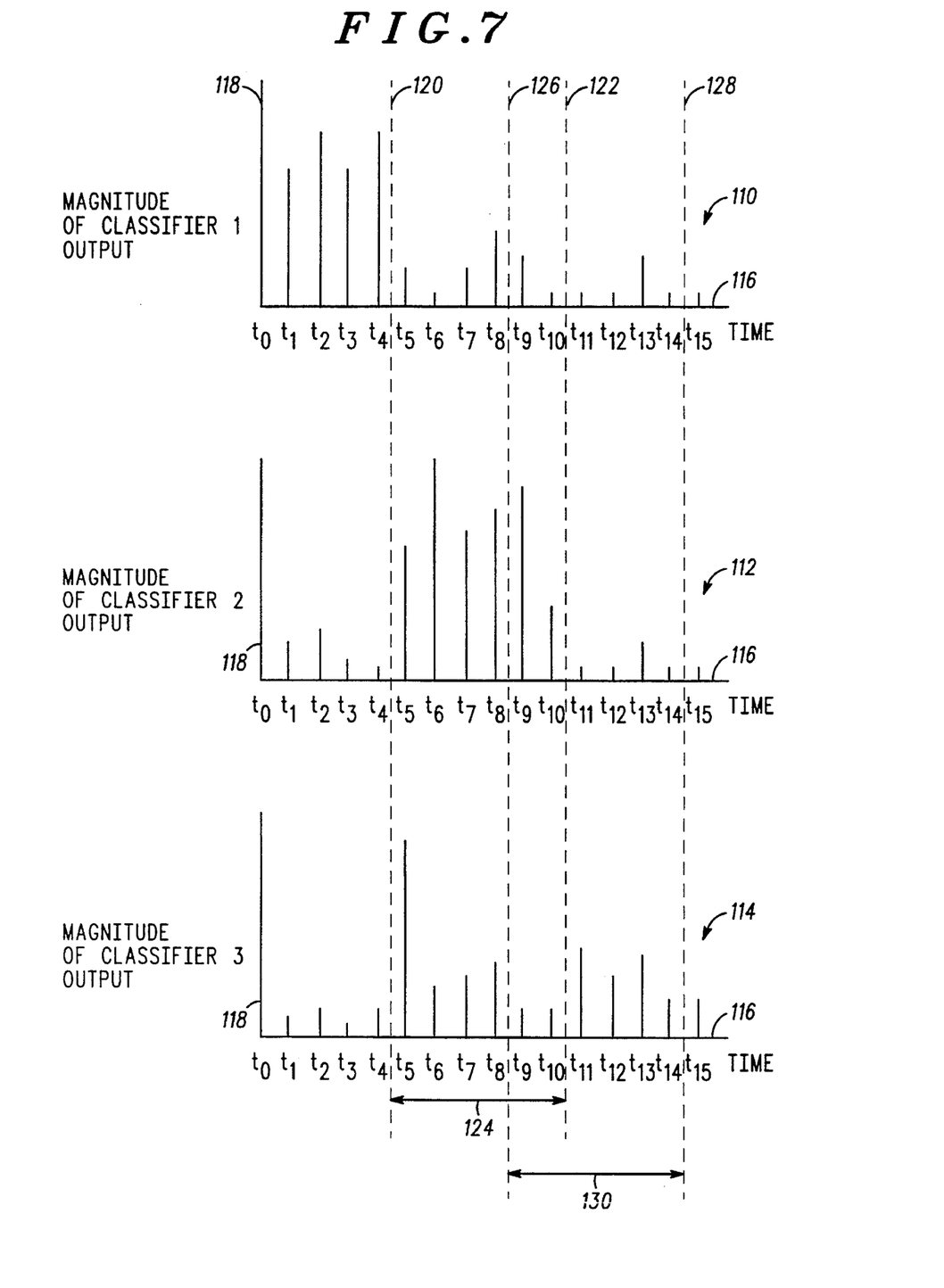
FIG. 7 shows a flow diagram of a method of identifying a spoken sound from continuously spoken speech in accordance with another embodiment of the present invention.

FIG. 7 shows a flow diagram of a method of identifying a spoken sound from continuously spoken speech in accordance with another embodiment of the present invention. In box 190, continuous speech is received by a speech-recognition system. In box 192, a sequence of samples is taken from the continuous speech. Generally, each sample corresponds to a different interval of time during the continuous speech. In box 194, a plurality of data frames are formed from the samples. Each data frame includes at least one sample; however, the data frame typically includes a sequence of samples.

Next, in box 196, a plurality of features are extracted from the data frames. Each feature corresponds to one of the data frames, and more than one feature may be extracted from a given data frame. Examples of features which may be extracted are cepstrum, predictive, and Fourier coefficients.

In box 198, a sequence of feature frames are formed. Each feature frame corresponds to an interval of the continuous speech and includes at least one of the extracted features.

In box 200, at least two of the feature frame is classified by computing one or more discriminant functions which yield results. Each result indicates the likelihood of a particular feature frame belonging to the class corresponding to the discriminant function. In response to a sequence of feature frames, a discriminant function generates a sequence of outputs wherein each output corresponds to specific interval of the continuous speech.

In box 202, a voting window is defined. A voting window includes a subset of outputs from each of the discriminant functions; furthermore, a voting window corresponds to a predetermined windowing interval of time and includes only those outputs generated during the predetermined windowing interval. Next, in box 204, a plurality of winning outputs is determine within the predetermined windowing interval. A winning output is simply a discriminant function output having the greatest magnitude at a corresponding specific feature interval. Since the duration of a voting window includes more than one specific interval, more than one winning output will be determined for the voting window.

In box 206, the spoken sound is identified by determining a winning classifier or class label within the voting window. The winning class label corresponds to the discriminant function which produces the most winning outputs during the predetermined windowing interval.

In box 208, a system output is generated which includes the winning class label.

In decision box 210, a check is made to determine whether another system output should be generated. If so, the method proceeds to box 212. If not, the method terminates.

In box 212, another voting window is defined which includes a different subset of discriminant function outputs and corresponds to a different predetermined windowing interval. Upon exiting box 212, the method returns to box 204.

Figure 8:
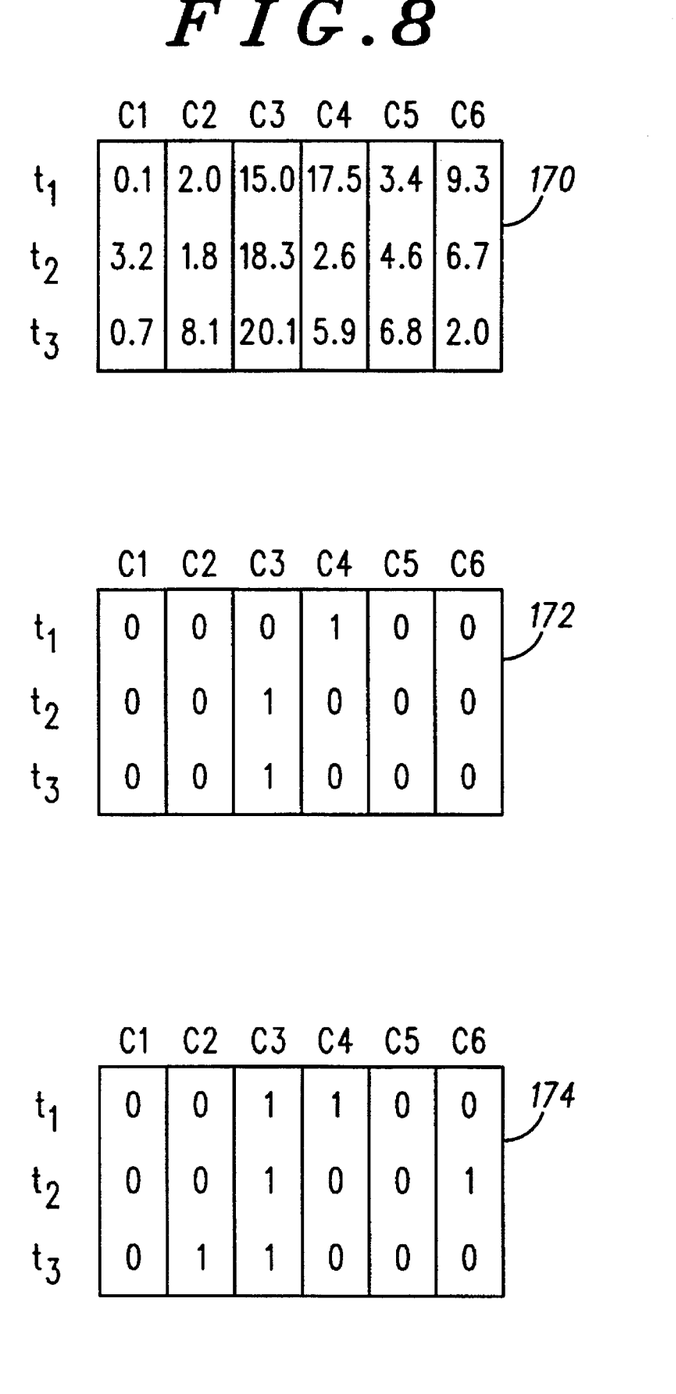
FIG. 8 shows a block diagram of a system in accordance with one embodiment of the present invention.

FIG. 8 shows a block diagram of a system in accordance with one embodiment of the present invention. This embodiment is used in a speech recognition of the type generally described with reference to FIG. 2 and implements the methods described in conjunction with FIG. 3. A plurality of classifiers 220, each generate, over time, a sequence of individual outputs 224 in the form of output signals. Defining means 222 defines a voting window which has a duration and includes a subsequence of outputs from each of the plurality of classifiers, wherein each of the subsequence of outputs corresponds to an interval of time.

Determining means 226 determines a plurality of winning outputs 228, each winning output being a signal corresponding to one of the plurality of classifiers, by comparing each of the subsequence of outputs corresponding to a same interval of time to determine the output with the largest magnitude. Identifying means 230, in turn, identifies the spoken sound corresponding to the particular voting window by determining a winning classifier from the plurality of classifiers, based on the classifier with the most winning outputs for that voting window. A signal 232, indicative of the winning classifier, is output by the identifying means 230.

Thus there has been described herein a concept, as well as several embodiments including a preferred embodiment, of a method and system for identifying spoken sounds in continuous speech.

Because the various embodiments of methods and systems for identifying spoken sounds in continuous speech as herein-described compare outputs from a plurality of classifiers, they provide a significant improvement in recognition accuracy.

Additionally, the various embodiments of the present invention as herein-described use comparison methods which allow spoken sounds in continuous speech to be identified in a manner that reduces the overall complexity and cost of a speech-recognition system.

It will be apparent to those, skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. In a speech-recognition system having a plurality of classifiers a method of identifying a spoken sound the method comprising the following steps:

(a) receiving a plurality of classifier output signal sequences from the classifiers, each of the classifier output signal sequences having been generated according to a polynomial discriminant function:

(b) defining a voting window to include portions of the classifier output signal sequences occurring within a finite period of time;

(c) selecting a winning classifier output corresponding to an interval within the finite period of the voting window, the winning classifier output signal having a magnitude larger than other classifier output signals that correspond to the same interval;

(d) repeating step (c) for a plurality of intervals occurring within the finite period to generate a plurality of winning classifier output signals; and (e) identifying the spoken sound by determining which of the classifier output signal sequences includes the most winning classifier output signals within the voting window.

2. The method of claim 1 further comprising the step of:

generating a system output which includes a class label representing the spoken sound.

3. The method of claim 1 wherein the polynomial discriminant function has a form $$y = \sum_{i=0}^{m} w_i;$$

wherein $x_j$ represents a plurality of features; wherein i, j, m and n are integers, y represents a classifier output signal; wherein $w_i$ represents a coefficient; wherein $g_{ji}$ represents an exponent.

4. The method of claim 1, wherein the classifier output signal sequences have a duration which is greater than the finite period of time of the voting window and step (b) includes the following sub-step:

defining the voting window so that the finite period of time overlaps with the finite period of time of a second voting window.

5. The method of claim 4 wherein the speech-recognition system identifies a plurality of spoken sounds from continuous speech.

6. The method of claim 1 wherein the plurality of intervals consists of three successive intervals.

7. The method of claim 1 wherein the spoken sound is selected from a group consisting of word, syllable, and phoneme.

8. A method for recognizing a spoken sound from continuous speech, comprising the following steps:

(a) receiving the continuous speech;

(b) sampling the continuous speech, over time, to form a sequence of sample datum which represents the continuous speech;

(c) partitioning the sequence of sample datum into a sequence of data frames, each of the sequence of data frames including at least two of the sequence of sample datum;

(d) extracting a plurality of features from the sequence of data frames;

(e) forming a sequence of feature frames from the plurality of features;

(f) distributing the sequence of feature frames to a plurality of classifiers, each of the classifiers generating a classifier output signal sequence in response thereto according to a polynomial discriminant function, whereby producing a plurality of classifier output signal sequences;

(g) defining a voting window to include portions of the classifier output signal sequences occurring within a finite period of time;

(h) selecting a winning classifier output signal corresponding to an interval within the finite period of the voting window, the winning classifier output signal having a magnitude larger than other classifier output signals that correspond to the same interval;

(i) repeating step (h) for a plurality of intervals occurring within the finite period to generate a plurality of winning classifier output signals; and (j) identifying the spoken sound by determining which of the classifier output signal sequences includes the most winning classifier output signals within the voting window.

9. The method of claim 8 further comprising the step of:

generating a system output which includes a winning class label representing the spoken sound.

10. The method of claim 8 wherein the polynomial discriminant function has a form $$y = \sum_{i=0}^{m} w_i;$$

wherein $x_j$ represents the plurality of features included in the feature frames; wherein i, j, m and n are integers, y represents a classifier output signal, wherein $w_i$ represents a coefficient; wherein $g_{ji}$ represents an exponent.

11. The method of claim 8 wherein classifier output signal sequences have a duration which is greater than the finite period of time of the voting window and step (g) includes the following sub-step:

defining the voting window so that the finite period of time overlaps with the finite period of time of a second voting window.

12. The method of claim 8 wherein the speech-recognition system recognizes a plurality of spoken sounds from the continuous speech.

13. The method of claim 8 wherein the plurality of intervals consists of three successive intervals.

14. The method of claim 8 wherein the spoken sound is selected from a group consisting of word, syllable, and phoneme.

15. A speech-recognition system for identifying a spoken sound, the speech-recognition system comprising:

a plurality of classifiers for generating a plurality of classifier output signal sequences, each of the classifier output signal sequences being generated according to a polynomial discriminant function;

defining means for defining a voting window to include portions of the classifier output signal sequences occurring within a finite period of time;

determining means, associatively coupled to the defining means and the plurality of classifiers, for comparing classifier output signals corresponding to an interval occurring within the voting window to select a winning classifier output signal corresponding to the interval, the winning classifier output signal having a largest magnitude, the determining means repeating the comparison for a plurality of intervals occurring within the voting window to generate a plurality of winning classifier output signals; and identifying means, associatively coupled to the defining means and the determining means, for identifying the spoken sound by determining which of the classifier output signal sequences includes the most winning classifier output signals within the voting window.

16. The speech-recognition system of claim 15 wherein the identifying means generates a system output which includes a class label representing the spoken sound.

17. The speech-recognition system of claim 15 wherein polynomial discriminant function has a form $$y = \sum_{i=0}^{m} w_i;$$

wherein $x_j$ represents a plurality of features; wherein i, j, m and n are integers, y represents a classifier output signal; wherein $w_i$ represents a coefficient; wherein $g_{ji}$ represents an exponent.

18. The speech-recognition system of claim 15 wherein the plurality of intervals consists of three successive intervals.

19. The speech-recognition system of claim 15 wherein the spoken sound is selected from the group consisting of word, syllable, and phoneme.

20. The speech-recognition system of claim 15, wherein the defining means defines a plurality of voting windows, each of the plurality of voting windows having a different starting time.

21. The speech-recognition system of claim 20, wherein the classifier output signal sequences have a duration which is greater than the finite period of time of the voting window and the defining means defines the voting window so that the finite period of time overlaps with the finite period of time of a second voting window.

22. The speech-recognition system of claim 20 wherein the speech-recognition system identifies a plurality of spoken sounds from continuous speech.

\* \* \* \* \*

UNITED STATES PATENT AND TRADEMARK OFFICE
CERTIFICATE OF CORRECTION

PATENT NO. : 5,596,679
DATED : January 21, 1997
INVENTOR(S) : Shay-Ping T. Wang

It is certified that error appears in the above-indentified patent and that said Letters Patent is hereby corrected as shown below:

Col. 11, line 12, between the words "output" and "corresponding" please insert --signal--.

Signed and Sealed this

Second Day of September, 1997

BRUCE LEHMAN

Attest:

Attesting Officer

Commissioner of Patents and Trademarks